United States Patent
Nishida

(10) Patent No.: US 9,335,176 B2
(45) Date of Patent: May 10, 2016

(54) INFORMATION PROCESSING DEVICE, PROCESSING METHOD, AND MEDIUM

(71) Applicant: JVC Kenwood Corporation, Yokohama-shi, Kanagawa (JP)

(72) Inventor: Megumi Nishida, Yokohama (JP)

(73) Assignee: JVC KENWOOD Corporation, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/331,265

(22) Filed: Jul. 15, 2014

(65) Prior Publication Data

US 2014/0324340 A1 Oct. 30, 2014

Related U.S. Application Data

(63) Continuation of application No. PCT/JP2013/076786, filed on Oct. 2, 2013.

(30) Foreign Application Priority Data

Oct. 10, 2012 (JP) ................................ 2012-224796

(51) Int. Cl.
  *G01B 3/00* (2006.01)
  *G01C 21/26* (2006.01)
  *G09B 29/10* (2006.01)
  *H04W 4/04* (2009.01)
  *H04W 4/00* (2009.01)

(52) U.S. Cl.
  CPC .............. *G01C 21/26* (2013.01); *G09B 29/106* (2013.01); *H04W 4/046* (2013.01); *H04W 4/008* (2013.01)

(58) Field of Classification Search
  CPC .................................................. G01B 12/006
  See application file for complete search history.

(56) References Cited

U.S. PATENT DOCUMENTS

| 2009/0182497 | A1* | 7/2009 | Hagiwara | G01C 21/36 701/533 |
| 2013/0151138 | A1* | 6/2013 | Lu | G09B 29/106 701/410 |
| 2014/0358438 | A1* | 12/2014 | Cerny | G01C 21/00 701/537 |
| 2015/0094087 | A1* | 4/2015 | Chen | G01S 5/0252 455/456.1 |

FOREIGN PATENT DOCUMENTS

| JP | 2001333442 A | 11/2001 |
| JP | 2008107218 A | 5/2008 |
| JP | 2011075319 A | 4/2011 |
| JP | 2012141201 A | 7/2012 |

OTHER PUBLICATIONS

International Search Report dated Nov. 5, 2013 for corresponding PCT/JP2013/076786 application.

* cited by examiner

*Primary Examiner* — Thomas G Black
*Assistant Examiner* — Ana Thomas
(74) *Attorney, Agent, or Firm* — Nath Goldberg & Meyer; Jerald L. Meyer

(57) ABSTRACT

While a user carrying a mobile terminal is aboard a vehicle, communication is available between on-vehicle equipment and the mobile terminal by near field communication, and therefore, the mobile terminal stands by and only the location information measured by the on-vehicle equipment is transmitted to a server. After the user gets off the vehicle, radio communication between the on-vehicle equipment and the mobile terminal is cut off, and therefore, the mobile terminal starts measuring the location etc. and only the location information measured by the mobile terminal is transmitted to the server. The server accumulates the location information sent from the on-vehicle equipment or the mobile terminal. Then, the server generates an inquiry image in which figures each representing the movement trajectory of the user are combined on a map based on the accumulated location information and transmits the inquiry image to the on-vehicle equipment.

4 Claims, 9 Drawing Sheets

| DATE | SECTION | LOCATION COORDINATES (LATITUDE, LONGITUDE, ALTITUDE) |
|---|---|---|
| 2012/7/21 10:23 | NV | 139.02145, 38.23581, 10.346 |
| 2012/7/21 10:24 | NV | 139.27531, 38.29816, 23.769 |
| 2012/7/21 10:25 | NV | 139.41493, 38.35074, 36.854 |
| 2012/7/21 10:26 | NV | 139.45021, 38.60359, 22.125 |
| ⋮ | ⋮ | ⋮ |
| 2012/7/21 12:03 | CP | 140.68933, 39.26872, 83.769 |
| 2012/7/21 12:04 | CP | 140.68719, 39.26291, 83.954 |

USER ID: ABC0123

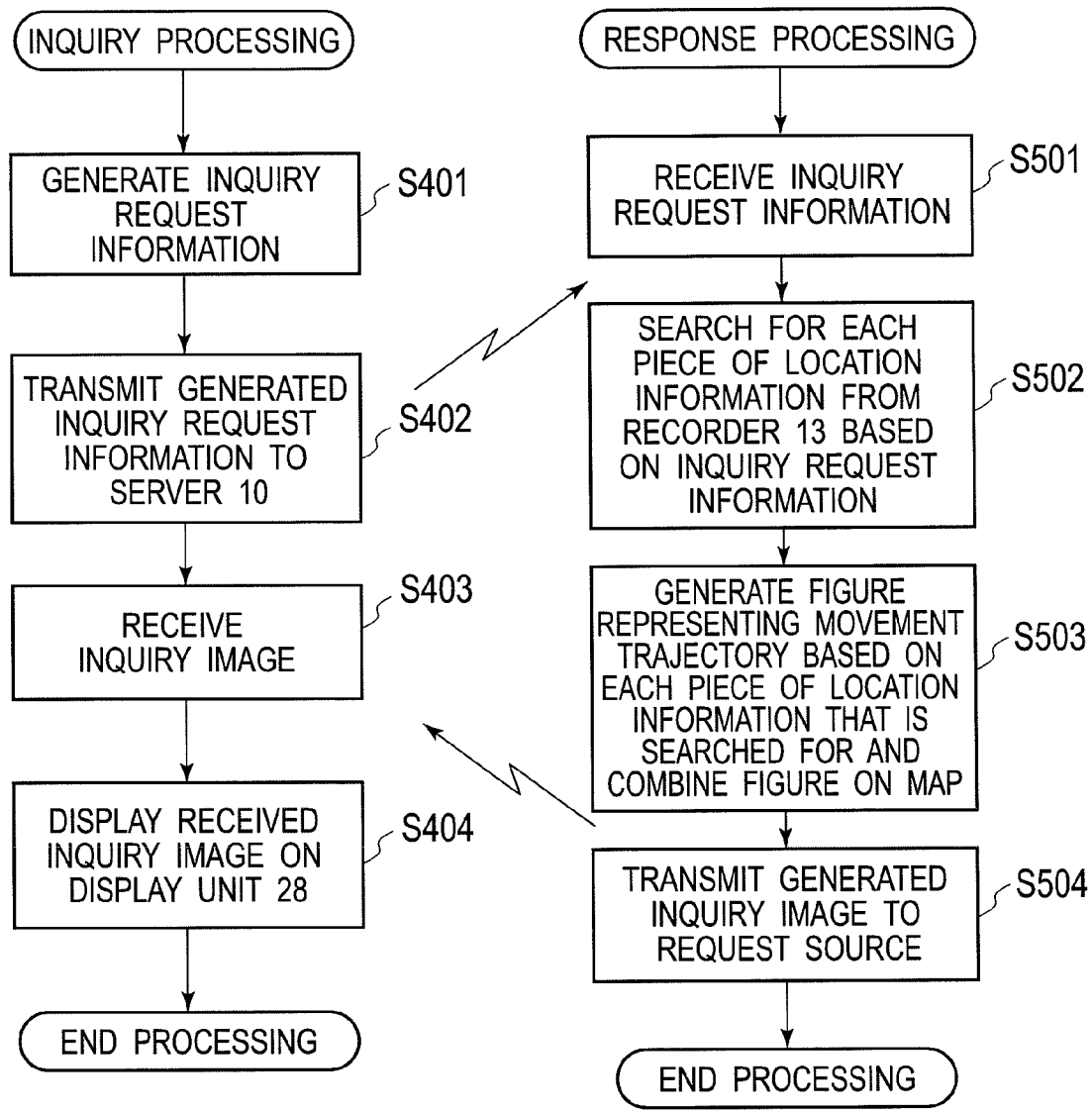

INFORMATION PROCESSING DEVICE, PROCESSING METHOD, AND MEDIUM

CROSS REFERENCE TO RELATED APPLICATION

This is a continuation application based on PCT application No. PCT/JP2013/076786 filed on Oct. 2, 2013, which claims the benefit of priority from Japanese Patent Application No. 2012-224796 filed on Oct. 10, 2012, the entire contents of which are incorporated by reference herein.

BACKGROUND

The present invention relates to an information processing device, a processing method, and a medium.

A system capable of displaying location information etc. of a vehicle (automobile etc.) on a map (navigation system etc.) is used by many users. For example, in Patent Literature 1 (Japanese Patent Application Laid-Open Publication No. 2001-333442), the GPS location information display system capable of displaying the movement trajectory of a moving object (vehicle) on a map is disclosed. In this system, it is made possible to switch between display and non-display of the movement trajectory in accordance with settings by a user.

However, the conventional system described above is a type of measuring and displaying location information of a vehicle on which on-vehicle equipment is mounted, and therefore, in the case where a user is outside the vehicle, it is not possible to measure location information of the user. On the other hand, in recent years, the mobile terminal represented by the mobile phone, the smartphone, etc., has the GPS function in many cases. Because of this, by using the mobile terminal having the GPS function, it is possible to measure location information of the user and it is also made possible to display the movement trajectory by accumulating location information.

SUMMARY

An object of the present invention is to provide an information processing device, a processing method, and a medium capable of appropriately processing the movement trajectory of a user.

According to a first aspect of the present invention, there is provided an information processing device including: an acquisition unit configured to acquire location information of moving object mounted equipment and a mobile terminal; a movement detector configured to detect movement of a moving object mounting the moving object mounted equipment; a processor configured to perform processing to select location information of the moving object mounted equipment as location information when the movement detector detects movement and to select location information of the mobile terminal as location information when the movement detector does not detect movement; and an output stop instruction unit configured to give an instruction to stop output of location information to the mobile terminal when the processor does not select location information of the mobile terminal.

According to a second aspect of the present invention, there is provided a processing method including: acquiring location information of moving object mounted equipment and a mobile terminal; detecting movement of a moving object mounting the moving object mounted equipment; performing processing to select location information of the moving object mounted equipment as location information when detecting movement in the detecting and to select location information of the mobile terminal as location information when not detecting movement in the detecting; and giving an instruction to stop output of location information to the mobile terminal when not selecting location information of the mobile terminal in the processing.

According to a third aspect of the present invention, there is provided a non-transitory computer usable medium having a computer readable program embodied therein, the program including: a first program code causing the computer to acquire location information of moving object mounted equipment and a mobile terminal; a second program code causing the computer to detect movement of a moving object mounting the moving object mounted equipment; a third program code causing the computer to perform processing to select location information of the moving object mounted equipment as location information when detecting movement by the detection and to select location information of the mobile terminal as location information when not detecting movement by the detection; and a fourth program code causing the computer to give an instruction to stop output of location information to the mobile terminal when not selecting location information of the mobile terminal by the processing.

BRIEF DESCRIPTION OF THE DRAWINGS

FIG. 7 is a flowchart showing an example of inquiry processing and response processing according to the first embodiment of the present invention.

DETAILED DESCRIPTION

The information processing device according to the present invention will be described below through various embodiments. In each embodiment, in order to facilitate understanding of the invention, as an example of the information processing device according to the present invention, a navigation system will be described, but it is also possible to implement the information processing device according to the present invention by extracting only necessary components from the navigation system. In other words, the information processing device according to the present invention is derived as a higher concept of the navigation system which will be described below.

(First Embodiment)

Figure 1:
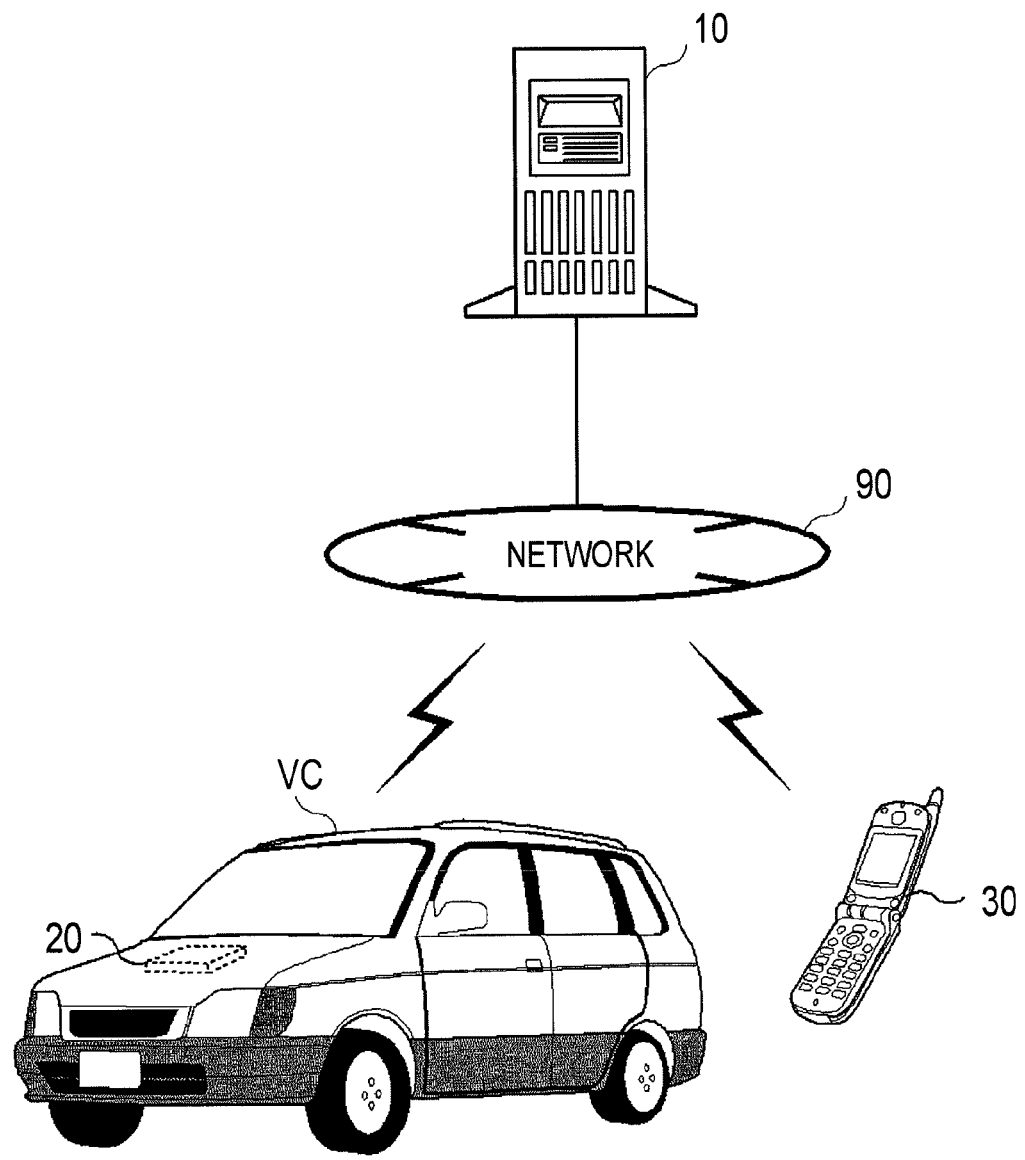
FIG. 1 is a schematic diagram showing an example of the general configuration of a navigation system according to a first embodiment of the present invention.

The navigation system according to a first embodiment of the present invention will be described below with reference to the drawings. FIG. 1 is a schematic diagram showing an example of the general configuration of a navigation system according to the present embodiment. As shown in FIG. 1, in the navigation system, a server 10 is connected to on-vehicle equipment 20 and a mobile terminal 30 via a network 90. The on-vehicle equipment 20 may be any on-vehicle device and may be one that can be appropriately detached for use. For example, the on-vehicle equipment 20 is an on-vehicle navigation device. The mobile terminal 30 is a mobile phone, a smartphone, an image capturing device, a PDA, etc. The on-vehicle equipment 20 is mounted for use on a vehicle VC of a user. The mobile terminal 30 is carried (held) by a user and used. The user can get on the vehicle VC and move while carrying the mobile terminal 30. Further, the user can move on foot etc. while carrying the mobile terminal 30 after getting off the vehicle VC. The on-vehicle equipment 20 and the mobile terminal 30 are configured to be capable of communicating with each other by predetermined near field communication, as will be described later.

Figures 2A, 2B:
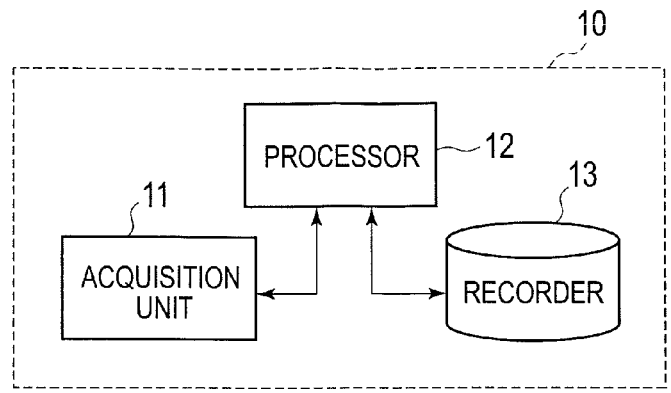
FIG. 2A is a block diagram showing a configuration example of a server according to the first embodiment of the present invention.
FIG. 2B is a schematic diagram showing an example of location information accumulated in a recorder according to the first embodiment of the present invention.

The server 10 includes a general-purpose computer etc., and obtains the movement trajectory of a user by receiving (acquiring) location information sent from the on-vehicle equipment 20 or the mobile terminal 30 and then accumulating (recording) the received location information. Hereinafter, a specific configuration of the server 10 will be described with reference to FIG. 2A. FIG. 2A is a block diagram showing a configuration example of the server 10. As shown in FIG. 2A, the server 10 includes an acquisition unit 11, a processor 12, and a recorder 13.

The acquisition unit 11 includes, for example, a communication device such as a modem, and acquires location information etc. from the on-vehicle equipment 20 or the mobile terminal 30 via the network 90. Specifically, the acquisition unit 11 acquires location information measured by the on-vehicle equipment 20 and location information measured by the mobile terminal 30. The location information represents the current location of a user measured by the on-vehicle equipment 20 or the mobile terminal 30 (to be precise, the current location of the on-vehicle equipment 20 or the mobile terminal 30). As an example, the location information is information including latitude, longitude, and altitude. The location information conveniently includes the date (year, month, day, time) when the measurement is performed, the section (type of equipment that performs the measurement), etc. The location information acquired by the acquisition unit 11 is accumulated (recorded sequentially) in the recorder 13 under the control of the processor 12. The acquisition unit 11 acquires inquiry request information when the inquiry request information for inquiring the movement trajectory of a user is sent from the on-vehicle equipment 20 or the mobile terminal 30. Following the acquisition of the inquiry request information, the processor 12 generates an inquiry image (e.g. an image in which the movement trajectory is combined on a map), as will be described later. Then, the acquisition unit 11 transmits the generated inquiry image to the on-vehicle equipment 20 or the mobile terminal 30 of a request source.

The processor 12 includes a CPU (Central Processing Unit), a ROM (Read Only Memory), a RAM (Random Access Memory), a built-in timer, etc. The processor 12 controls the whole of the server 10 by the CPU executing the program stored in the ROM. In the case where the server 10 stores the program in a hard disk etc. separately, the controller 12 controls the whole of the server 10 by the CPU executing the program stored in the hard disk etc. The processor 12 accumulates, in the recorder 13, the location information acquired by the acquisition unit 11 in association with information for identifying a user (e.g. user ID). Specifically, as shown in FIG. 2B, the processor 12 sequentially records, in the recorder 13, the location information including date, section, and location coordinates in association with the user ID. The date shown in FIG. 2B indicates the date when the measurement was performed by the on-vehicle equipment 20 or the mobile terminal 30. In the case where location information in which no date is included is sent, it may also be possible to set the date of reception using the time measured by the processor 12 (built-in timer etc.). The section shown in FIG. 2B includes a code etc. indicative of the type of equipment with which the measurement was performed. In the present embodiment, "NV" indicates the on-vehicle equipment 20 and "CP" indicates the mobile terminal 30.

The processor 12 may correct location information (values of location coordinates) sent from the mobile terminal 30 when accumulating the location information in the recorder 13. For example, when a transmission source of location information changes from the on-vehicle equipment 20 to the mobile terminal 30, the processor 12 corrects the location information received from the mobile terminal 30. Specifically, the processor 12 determines that the vehicle VC has stopped moving and that the transmission source has switched from the on-vehicle equipment 20 to the mobile terminal 30 in the case where the section of the received location information changes from "NV" to "CP". Then, the processor 12 corrects the values of the location coordinates of the location information received from the mobile terminal 30 based on the location information of the on-vehicle equipment 20 already recorded in the recorder 13 (location information at the time when the vehicle VC has stopped moving). In more detail, only during a period from the time of having switched (end time) until a predetermined time elapses, the processor 12 makes correction by subtracting (or adding) a fixed value from (to) the location coordinates of the location information received from the mobile terminal 30 so that the location coordinates become close to or agree with the values of the location coordinates of the on-vehicle equipment 20 at the end time. The correction method such as this is merely an example and may be appropriately changed in accordance with the measurement accuracy etc. of the mobile terminal 30.

On the other hand, when the transmission source has changed from the mobile terminal 30 to the on-vehicle equipment 20, the processor 12 corrects the already recorded location information of the mobile terminal 30. Specifically, in the case where the section of the received location information has changed from "CP" to "NV", the processor 12 determines that the vehicle VC has started moving and the transmission source has switched from the mobile terminal 30 to the on-vehicle equipment 20. Then, the processor 12 corrects the values of the location coordinates of the location information already recorded in the recorder 13 (location information of the mobile terminal 30) based on the location information received from the on-vehicle equipment 20 (location information at the time when the vehicle VC started moving). In more detail, only for the location information recorded during a period from the time of having switched (start time) until a predetermined time before, the processor 12 subtracts (or adds) a fixed value from (or to) the location coordinates of the location information already recorded so that the location coordinates become close to the values of location coordinates of the on-vehicle equipment 20 at the start time. The correction method such as this is merely an example and the method may be changed appropriately in accordance with the measurement accuracy etc. of the mobile terminal 30. Further, it is possible to appropriately process the movement trajectory of a user even if such correction processing is not necessarily performed.

As the method for detecting the start time when movement is started and the end time when the movement is ended, various kinds of methods may be used. For example, it may also be possible to detect the start time and the end time by the turning on/off of the power source of the on-vehicle equipment 20 or to detect whether or not the vehicle is moving based on the location information of the on-vehicle equipment 20. It is preferable to regard the stop by a traffic light and the temporary stop in the state where the power source of the vehicle is kept on as a moving time.

The processor 12 searches for location information in the target range from the recorder 13 using the user ID etc. included in inquiry request information as a key when the acquisition unit 11 acquires the inquiry request information (information for inquiring the movement trajectory of a user). Then, the processor 12 generates a figure (e.g. a free curve) representing the movement trajectory based on each piece of the location information that is searched for and combines the figure with map information read from the recorder 13. The processor 12 transmits an inquiry image in which the movement trajectories of a user are combined on the map to the on-vehicle equipment 20 or the mobile terminal 30 of a request source.

The recorder 13 includes, for example, database etc. and accumulates the location information received from the on-vehicle equipment 20 or the mobile terminal 30. Specifically, as shown in FIG. 2B, the recorder 13 associates the location information with the user ID and records the location information in the state where the processor 12 can make a search in the specified range of date etc. The recorder 13 also stores information necessary when creating an inquiry image, such as map information (road information) and various kinds of images.

Returning to FIG. 1, the on-vehicle equipment 20 is mounted on the vehicle VC of a user and is activated when an ACC switch (accessory switch) of the vehicle VC turns on. The on-vehicle equipment 20 stops activation when the ACC switch turns off. It may also be possible for the on-vehicle equipment 20 to include a battery having a predetermined capacity, a high-capacity capacitor, etc., to enable processing for a predetermined short time after the ACC switch turns off, and then to stop its activation after performing predetermined processing.

Figure 3:
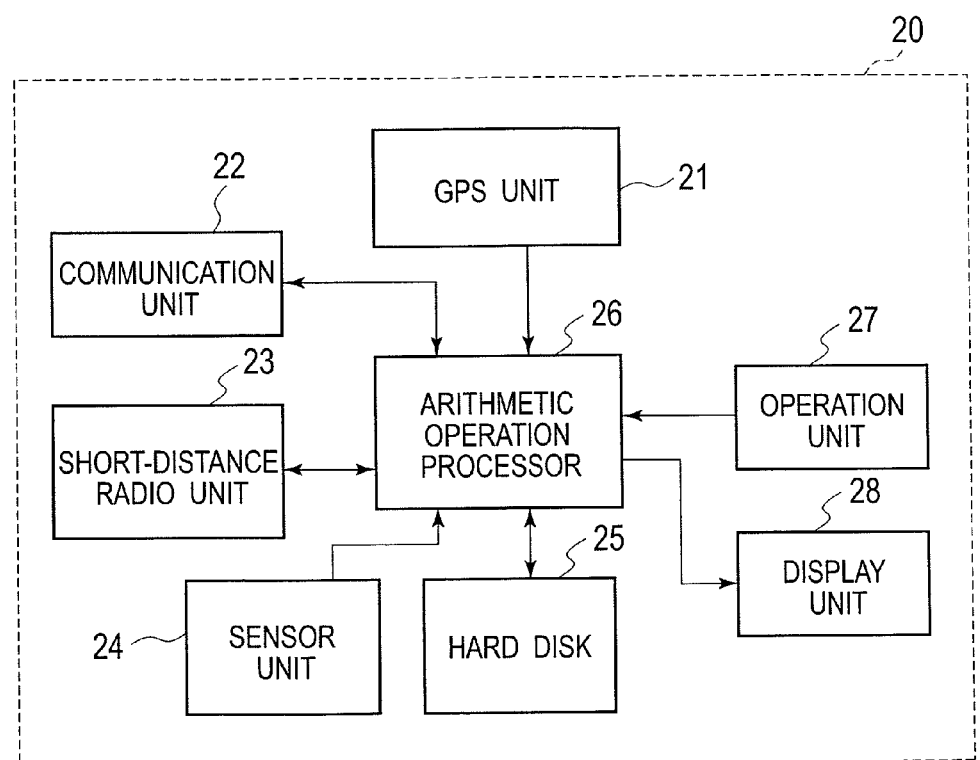
FIG. 3 is a block diagram showing a configuration example of on-vehicle equipment according to the first embodiment of the present invention.

A specific configuration of the on-vehicle equipment 20 will be described below with reference to FIG. 3. FIG. 3 is a block diagram showing a configuration example of the on-vehicle equipment 20. As shown in FIG. 3, the on-vehicle equipment 20 includes a GPS unit 21, a communication unit 22, a short-distance radio unit 23, a sensor unit 24, a hard disk 25, an arithmetic operation processor 26, an operation unit 27, and a display unit 28.

The GPS (Global Positioning System) unit 21 receives signals sent from a plurality of GPS satellites and measures the current location of a user (to be precise, the location of the vehicle VC). For example, the GPS unit 21 measures location information including latitude, longitude, and altitude. Then, the GPS unit 21 supplies the measured location information to the arithmetic operation processor 26.

The communication unit 22 includes a communication unit etc. capable of mobile communication and can be connected to the network 90 via the closest base station etc. In other words, the communication unit 22 can transmit and receive information to and from the server 10 by connecting to the network 90 even when the vehicle VC is traveling. For example, the communication unit 22 accesses the server 10 at predetermined time intervals and transmits the location information measured by the GPS unit 21. Further, the communication unit 22 transmits inquiry request information for inquiring the movement trajectory of a user to the server 10 and receives an inquiry image of the movement trajectory returned from the server 10.

The short-distance radio unit 23 includes a radio unit etc. capable of near field communication in conformity with predetermined standards and can perform radio communication with the mobile terminal 30 in the vicinity thereof (specifically, within the vehicle VC). For example, the short-distance radio unit 23 is in conformity with predetermined short-distance radio standards, such as Bluetooth (registered trademark), Wireless LAN, and infrared communication, and can communicate with the mobile terminal 30 carried by a user within the vehicle VC. Specifically, connection settings called pairing information are done between the short-distance radio unit 23 and the mobile terminal 30. For example, when the ACC switch of the vehicle VC turns on and the on-vehicle equipment 20 is activated (when the vehicle VC starts moving), if the mobile terminal 30 exists within the vehicle VC, pairing is performed automatically and radio communication is made available.

The sensor unit 24 includes a vehicle velocity sensor, a direction sensor, etc., and detects data indicative of the velocity, direction, etc., of the vehicle VC. The sensor unit 24 supplies the detected data to the arithmetic operation processor 26.

The hard disk 25 stores information necessary for route display etc. such as map information (road information) and various kinds of images. Various kinds of images include a symbol etc. indicative of the current location etc. The hard disk 25 reads necessary information in response to a request from the arithmetic operation processor 26 and supplies the information to the arithmetic operation processor 26. Further, the hard disk 25 also stores a user ID for identifying a user, a password, an address (URL or port No.) of the server 10, etc.

The arithmetic operation processor 26 includes, for example, a CPU, ROM, RAM, built-in timer, etc. By executing the program stored in the ROM, the CPU controls the whole of the on-vehicle equipment 20. The program may be stored in the hard disk 25. In this case, by executing the program stored in the hard disk 25, the CPU controls the whole of the on-vehicle equipment 20. Specifically, the arithmetic operation processor 26 finds out the current location based on the location information measured by the GPS unit 21, and displays a map on the display unit 28 after combining a symbol etc. on the map. In the case where it is not possible for the GPS unit 21 to measure location information because the vehicle VC is traveling in a tunnel etc., the arithmetic operation processor 26 measures location information by the autonomous navigation using data etc. obtained from the sensor unit 24.

The arithmetic operation processor 26 controls the communication unit 22 at predetermined time intervals (e.g. at 30 sec intervals), and accesses the server 10 with the user ID and the password etc., if necessary, and transmits location information. At that time, the arithmetic operation processor 26 transmits the location information to the server 10 after attaching the current date and the section (e.g. "NV", the model type indicative of the on-vehicle equipment 20) to the location information.

It may also be possible for the arithmetic operation processor 26 to transmit a plurality of pieces of location information together to the server 10 when predetermined conditions are satisfied instead of transmitting location information at such predetermined time intervals. For example, the arithmetic operation processor 26 accumulates location information in the hard disk 25 at predetermined time intervals and transmits each piece of accumulated location information to the server 10 when the velocity of the vehicle VC becomes zero based on the data obtained from the sensor unit 24. Then, the arithmetic operation processor 26 deletes each piece of location information already transmitted from the hard disk 25.

When instructions to inquire the movement trajectory are given from a user via the operation unit 27, the arithmetic operation processor 26 generates inquiry request information including the user ID etc. and transmits the inquiry request information to the server 10 by controlling the communication unit 22. Then, when the communication unit 22 receives an inquiry image of the movement trajectory returned from the server 10, the arithmetic operation processor 26 displays the inquiry image on the display unit 28.

The operation unit 27 includes, for example, a touch panel etc. arranged on the front surface of the display unit 28 and receives the contents of operation from a user (input instructions etc.). The operation unit 27 may be an infrared remote controller etc.

The display unit 28 includes, for example, a liquid crystal display etc. and displays a map, a predetermined guide image, etc. Specifically, the display unit 28 displays the map generated by the arithmetic operation processor 26 after combining a symbol etc. indicative of the current location on the map. Further, in the case where instructions to inquire the movement trajectory are given from the operation unit 27 and the inquiry image of the movement trajectory is received from the server 10, the display unit 28 displays the inquiry image.

Figure 4:
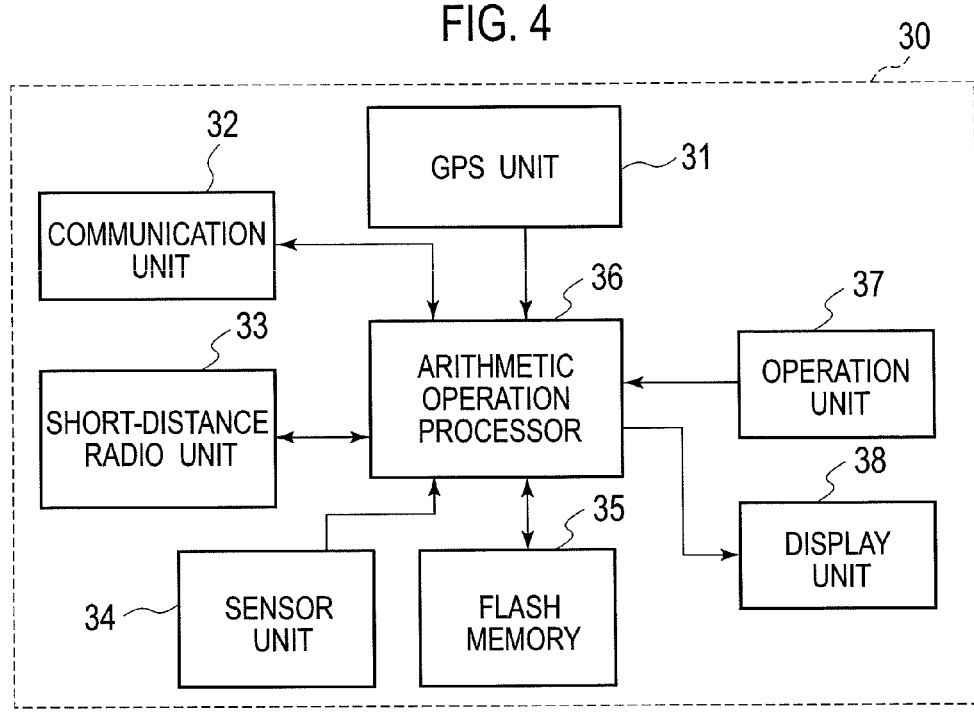
FIG. 4 is a block diagram showing a configuration example of a mobile terminal according to the first embodiment of the present invention.

Returning to FIG. 1, the mobile terminal 30 includes a mobile phone, a smartphone, etc., and is carried by a user and moves together with the user. For example, when the user is aboard the vehicle VC, the mobile terminal 30 moves following the travel of the vehicle VC and after the user gets off the vehicle VC, the mobile terminal 30 moves following the walk etc. of the user. A specific configuration of the mobile terminal 30 will be described below with reference to FIG. 4. FIG. 4 is a block diagram showing a configuration example of the mobile terminal 30. As shown in FIG. 4, the mobile terminal 30 includes a GPS unit 31, a communication unit 32, a short-distance radio unit 33, a sensor unit 34, a flash memory 35, an arithmetic operation processor 36, an operation unit 37, and a display unit 38.

The GPS unit 31 receives signals sent from a plurality of GPS satellites and measures the current location of a user (to be precise, the location of the mobile terminal 30). For example, the GPS unit 31 measures location information including latitude, longitude, and altitude, and supplies the measured location information to the arithmetic operation processor 36.

The communication unit 32 includes a communication unit etc. capable of mobile communication, and can connect to the network 90 via the closest base station etc. and communicate with another terminal (not shown) (transmission and reception of audio information). Further, it is also made possible for the communication unit 32 to connect to the network 90 and to transmit and receive information to and from the server 10. For example, the communication unit 32 accesses the server 10 at predetermined time intervals and transmits the location information measured by the GPS unit 31. Further, the communication unit 32 transmits inquiry request information for inquiring the movement trajectory of a user to the server 10 and receives an inquiry image of the movement trajectory returned from the server 10.

The short-distance radio unit 33 includes a radio unit etc. capable of near field communication in conformity with predetermined standards and can perform radio communication with the on-vehicle equipment 20 in the vicinity thereof. For example, the short-distance radio unit 33 is in conformity with predetermined short-distance radio standards, such as Bluetooth (registered trademark), Wireless LAN, and infrared communication, and can communicate with the on-vehicle equipment 20 while a user carrying the mobile terminal 30 is aboard the vehicle VC. Specifically, pairing information is set in advance between the short-distance radio unit 33 and the on-vehicle equipment 20. For example, when a user carrying the mobile terminal 30 gets on the vehicle VC, and the ACC switch turns on and the vehicle VC starts moving, pairing is performed automatically with the on-vehicle equipment 20 and radio communication is made available. On the other hand, when the ACC switch turns off and the vehicle VC stops moving, the radio communication with the on-vehicle equipment 20 is cut off and the short-distance radio unit 33 detects cut-off of communication. Also when the user carrying the mobile terminal 30 moves on foot also, the radio communication with the on-vehicle equipment 20 is cut off and the short-distance radio unit 33 detects cut-off of communication.

The sensor unit 34 includes an acceleration sensor, a direction sensor, etc., and detects data indicative of the velocity, direction, etc., of the mobile terminal 30. The sensor unit 34 supplies the detected data to the arithmetic operation processor 36.

The flash memory 35 stores information of various kinds of applications installed on the mobile terminal 30. For example, in the case of the application of navigation, the flash memory 35 also stores information necessary for route display etc., such as map information (road information) and various kinds of images. Various kinds of images also include a symbol etc. indicative of the current location etc. Then, the flash memory 35 reads necessary information in response to a request and supplies the information to the arithmetic operation processor 36. Further, the flash memory 35 also stores a user ID for identifying a user, a password, an address (URL or port No.) of the server 10, etc.

The arithmetic operation processor 36 includes, for example, a CPU, a ROM, a RAM, a built-in timer, etc. By executing the program stored in the ROM, the CPU controls the whole of the mobile terminal 30. In more detail, the arithmetic operation processor 36 can execute the various kinds of applications stored in the flash memory 35 on a predetermined OS (Operating System). Specifically, when the application of navigation is executed, first, the arithmetic operation processor 36 determines whether communication with the on-vehicle equipment 20 is available. In other words, the arithmetic operation processor 36 determines whether it is possible for the short-distance radio unit 33 to perform near field communication with the on-vehicle equipment 20 based on pairing information. Here, when determining that near field communication can be performed, the arithmetic operation processor 36 stands by while sequentially checking the communication state.

On the other hand, when determining that near field communication cannot be performed (communication is cut off), the arithmetic operation processor 36 controls the GPS unit 31 and causes the GPS unit 31 to generate location information. In the case where it is not possible for the GPS unit 31 to measure location information because, for example, the user is walking in a building (indoors), the arithmetic operation processor 36 measures location information by the autonomous navigation using data etc. obtained from the sensor unit 34.

The arithmetic operation processor 36 controls the communication unit 32 at predetermined time intervals (e.g. at 30 sec intervals), and accesses the server 10 with the user ID and the password etc., if necessary, and transmits location information. At that time, the arithmetic operation processor 36 transmits the location information to the server 10 after attaching the current date and the section (e.g. "CP", the model type indicative of the mobile terminal 30) to the location information.

It may also be possible for the arithmetic operation processor 36 to transmit a plurality of pieces of location information together to the server 10 when predetermined conditions are satisfied instead of transmitting location information at predetermined time intervals. For example, the arithmetic operation processor 36 accumulates location information in the flash memory 35 at predetermined time intervals and transmits each piece of accumulated location information to the server 10 when the velocity of the user becomes zero (when the user stops walking etc.) based on the data obtained from the sensor unit 34. Then, the arithmetic operation processor 36 deletes each piece of location information already transmitted from the flash memory 35.

When instructions to inquire the movement trajectory are given from a user via the operation unit 37, the arithmetic operation processor 36 generates inquiry request information including the user ID etc. and transmits the information to the server 10 by controlling the communication unit 32. Then, when the communication unit 32 receives an inquiry image of the movement trajectory returned from the server 10, the arithmetic operation processor 36 displays the inquiry image on the display unit 38.

The operation unit 37 includes, for example, each switch (key) etc. arranged on the mobile terminal 30 and receives the contents of operation from a user (input instructions etc.). The operation unit 37 may be a touch panel etc. arranged on the front surface of the display unit 38.

The display unit 38 includes, for example, a liquid crystal display etc. and displays an operation menu of the mobile terminal 30 and images, such as icons to execute various kinds of applications. Then, when one of the applications is executed by the arithmetic operation processor 36, the display unit 38 displays an image generated by the application.

Specifically, in the case where the application of navigation is executed, the display unit 38 displays the map generated by the arithmetic operation processor 36 after combining a symbol etc. indicative of the current location on the map. Further, in the case where instructions to inquire the movement trajectory are given from the operation unit 37 and the inquiry image of the movement trajectory is received from the server 10, the display unit 38 displays the inquiry image.

It may also be possible for the display unit 38 to suppress power consumption low by turning off the screen display when a predetermined time elapses without any operation performed to the operation unit 37 during the display of the map image etc.

Figure 5A:
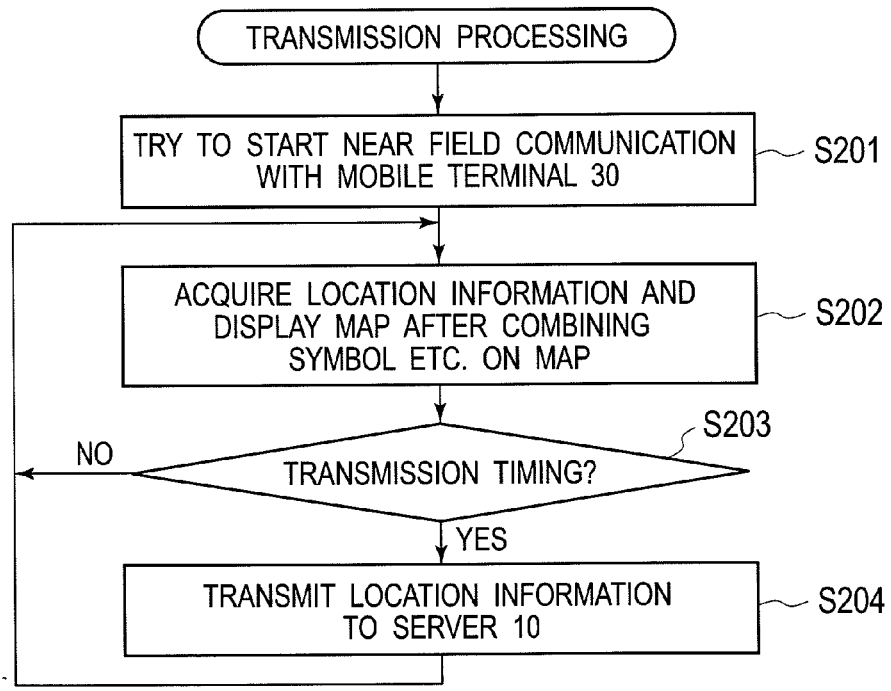
FIG. 5A is a flowchart showing an example of transmission processing performed by the on-vehicle equipment according to the first embodiment of the present invention.
Figure 5B:
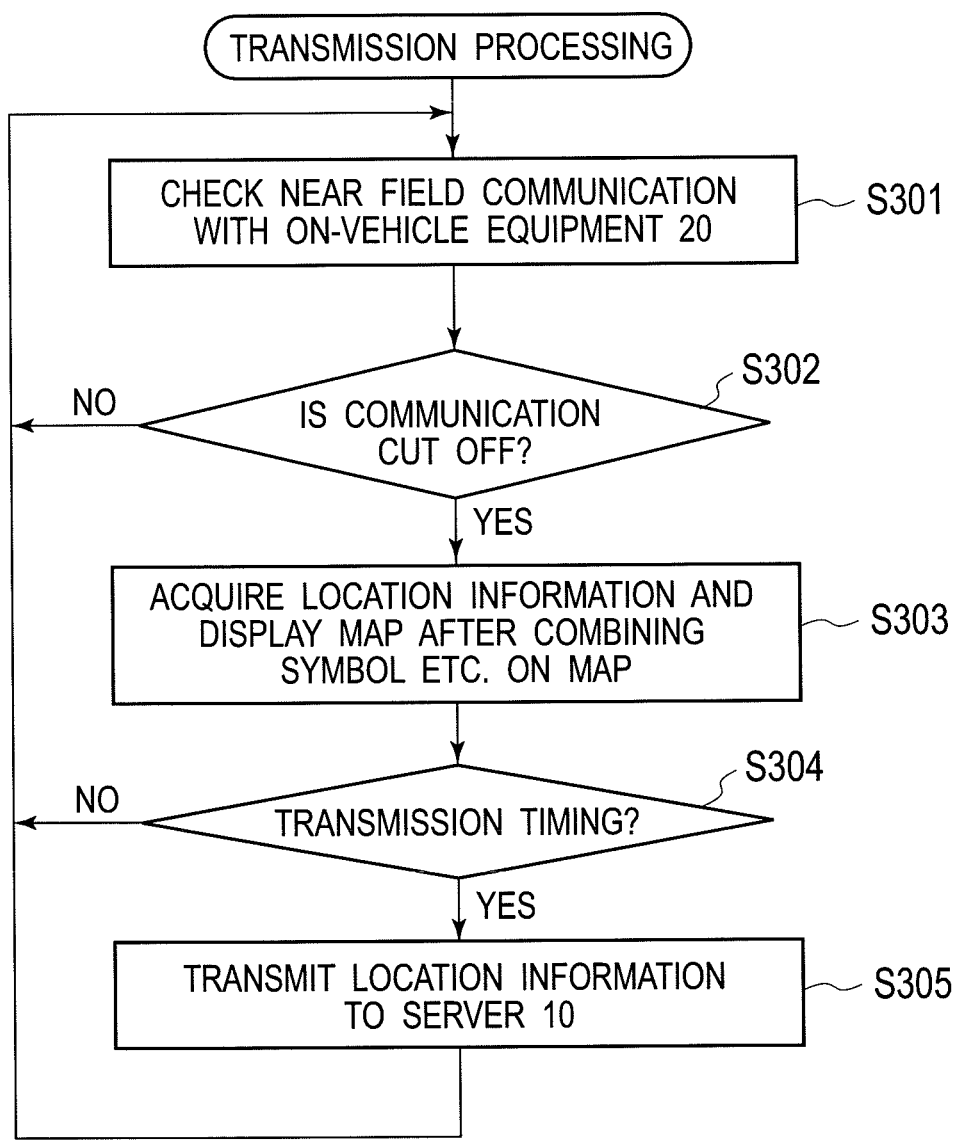
FIG. 5B is a flowchart showing an example of transmission processing performed by the mobile terminal according to the first embodiment of the present invention.

Next, the specific operation of the navigation system will be described below with reference to the drawings. First, the transmission operation of location information performed by the on-vehicle equipment 20 and the mobile terminal 30 will be described with reference to FIGS. 5A and 5B. FIG. 5A is a flowchart showing an example of transmission processing performed by the on-vehicle equipment 20. FIG. 5B is a flowchart showing an example of transmission processing performed by the mobile terminal 30. For example, the on-vehicle equipment 20 starts the transmission processing shown in FIG. 5A when the ACC switch turns on and the vehicle VC starts moving. The mobile terminal 30 starts the transmission processing shown in FIG. 5B when instructions to execute the application of navigation are given.

First, the transmission processing performed by the on-vehicle equipment 20 will be described. As shown in FIG. 5A, first, the on-vehicle equipment 20 tries to start near field communication with the mobile terminal 30 (step S201). For example, the short-distance radio unit 23 tries to perform pairing with the mobile terminal 30 based on the pairing information set in advance. At that time, when the mobile terminal 30 is located within the vehicle VC (when the user carrying the mobile terminal 30 is aboard), near field communication with the mobile terminal 30 is established. After that, the state where near field communication is available is maintained until the ACC switch turns off and the vehicle VC stops moving (while the mobile terminal 30 is also activated).

The on-vehicle equipment 20 acquires location information and display a map after combining a symbol etc. on the map (step S202). In other words, the GPS unit 21 measures location information including, for example, latitude, longitude, and altitude. Then, the arithmetic operation processor 26 finds out the current location based on the location information measured by the GPS unit 21 and displays a map on the display unit 28 after combining a symbol etc. on the map.

The on-vehicle equipment 20 determines whether the timing to transmit location information is reached (step S203). For example, the arithmetic operation processor 26 measures time with a built-in timer etc. and determines whether a predetermined time (e.g. 30 sec) has elapsed from the previous transmission timing. In the case where transmission is not performed yet, it is determined that the transmission timing is reached regardless of the elapsed time. When determining that the transmission timing is not reached (e.g. 30 sec has not elapsed yet from the previous transmission timing) (step S203; No), the on-vehicle equipment 20 returns the processing to step S202.

On the other hand, when determining that the transmission timing is reached (e.g. 30 sec has elapsed from the previous transmission timing) (step S203; Yes), the on-vehicle equipment 20 transmits location information to the server 10 (step S204). In other words, the arithmetic operation processor 26 adds the current date, the section, etc., to the measured location information and transmits the location information to the server 10 by controlling the communication unit 22. Then, the on-vehicle equipment 20 returns the processing to step S202 and performs the processing at steps S202 to S204 repeatedly. In other words, the on-vehicle equipment 20 continues such transmission processing until the ACC switch turns off and the vehicle VC stops moving.

Next, transmission processing performed by the mobile terminal 30 will be described. As shown in FIG. 5B, first, the mobile terminal 30 checks near field communication with the on-vehicle equipment 20 (step S301). For example, the short-distance radio unit 33 checks whether radio communication with the on-vehicle equipment 20 is available based on pairing information. Specifically, if a user carrying the mobile terminal 30 is aboard the vehicle VC (the ACC switch is on), the state where near field communication with the on-vehicle equipment 20 is available is brought about. On the other hand, if the user carrying the mobile terminal 30 is not aboard the vehicle VC (for example, the user moves on foot), the state where near field communication with the on-vehicle equipment 20 is unavailable is brought about.

The mobile terminal 30 determines whether or not radio communication with the on-vehicle equipment 20 is cut off based on the check of near field communication (step S302). When determining that communication is not cut off (communication is available) (step S302; No), the mobile terminal 30 returns the processing to step S301. In other words, it is possible to determine that location information is transmitted from the on-vehicle equipment 20 of the vehicle VC to the server 10, and therefore, the mobile terminal 30 returns the processing to step S301 without performing the subsequent processing. In other words, the mobile terminal 30 suppresses power consumption as low as possible by standing by while sequentially checking radio communication with the on-vehicle equipment 20.

On the other hand, when determining that communication is cut off (communication is unavailable) (step S302; Yes), the mobile terminal 30 acquires location information and displays a map after combining a symbol etc. on the map (step S303). In other words, the GPS unit 31 measures location information including, for example, latitude, longitude, and altitude. Then, the arithmetic operation processor 36 finds out the current location based on the location information measured by the GPS unit 31 and displays a map on the display unit 38 after combining a symbol etc. on the map. At this time, it may also be possible for the mobile terminal 30 only to measure location information without producing a display etc. in order to suppress power consumption as low as possible.

The mobile terminal 30 determines whether or not the transmission timing of location information is reached (step S304). For example, the arithmetic operation processor 36 measures time with a built-in timer etc. and determines whether a predetermined time (e.g. 30 sec) has elapsed from the previous transmission timing. In the case where location information is not transmitted yet, the mobile terminal 30 determines that the transmission timing is reached regardless of the elapsed time. When determining that the transmission timing is not reached (e.g. 30 sec has not elapsed yet from the previous transmission timing) (step S304; No), the mobile terminal 30 returns the processing to step S301.

On the other hand, when determining that the transmission timing is reached (e.g. 30 sec has elapsed from the previous transmission timing) (step S304; Yes), the mobile terminal 30 transmits location information to the server 10 (step S305). In other words, the arithmetic operation processor 36 adds the current date, the section, etc., to the measured location information and transmits the location information to the server 10 by controlling the communication unit 32. Then, the mobile terminal 30 returns the processing to step S301 and performs the processing at steps S301 to S305 repeatedly. In other words, the mobile terminal 30 continues such transmission processing while executing the application of navigation.

Figure 6A:
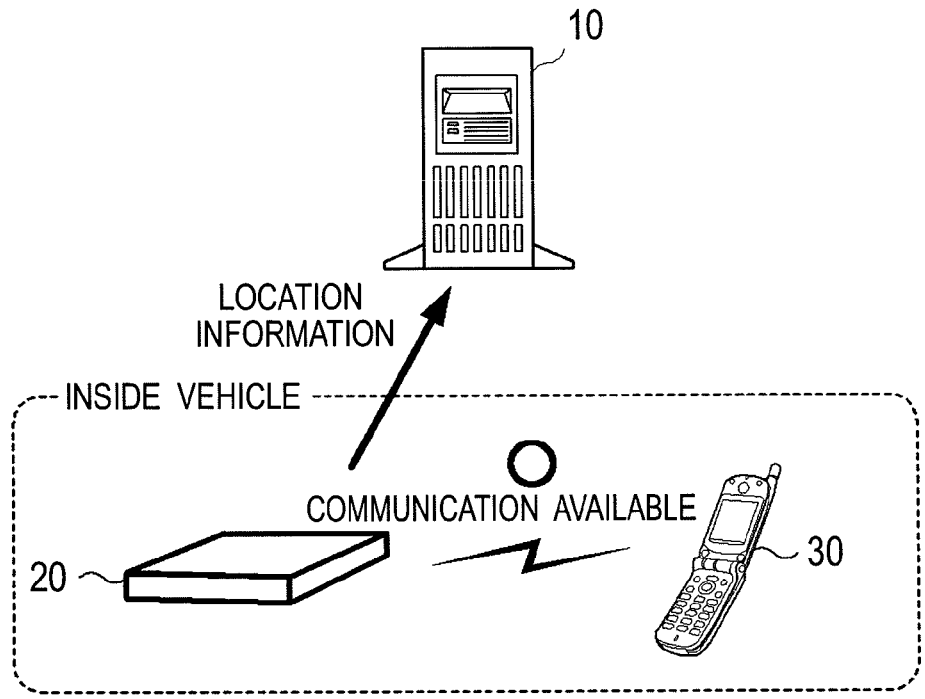
FIG. 6A is a schematic diagram for explaining the way location information is sent to the server from the on-vehicle equipment according to the first embodiment of the present invention.

By such transmission processing, the location information indicative of the location of the user is transmitted to the server 10 from one of the on-vehicle equipment 20 and the mobile terminal 30. Specifically, while the user carrying the mobile terminal 30 is aboard the vehicle VC (until the ACC switch turns off and the vehicle VC stops moving), as shown in FIG. 6A, near field communication is available between the on-vehicle equipment 20 and the mobile terminal 30, and therefore, the mobile terminal 30 stands by without performing measurement or transmission and location information is transmitted to the server 10 only from the on-vehicle equipment 20. In other words, in the state where it is possible for both the on-vehicle equipment 20 and the mobile terminal 30 to measure location information, only the location information of the on-vehicle equipment 20, which has a comparatively high accuracy of measurement, will be transmitted to the server 10 as a result. At that time, the mobile terminal 30 stands by without performing measurement or transmission, and therefore, it is possible to reduce power consumption and to lengthen the life of a battery etc.

Figure 6B:
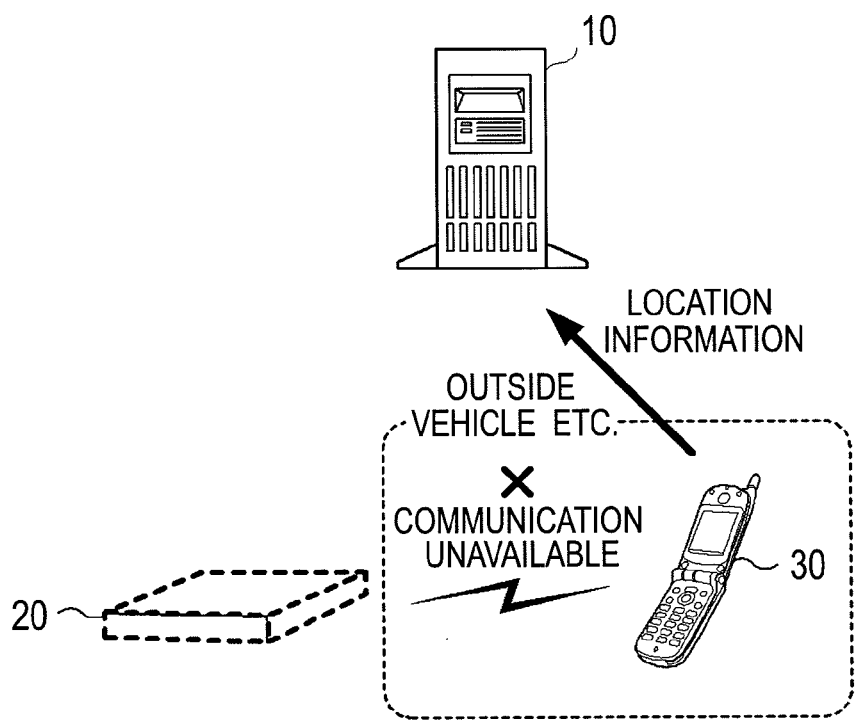
FIG. 6B is a schematic diagram for explaining the way location information is sent to the server from the mobile terminal according to the first embodiment of the present invention.

On the other hand, after the user gets off the vehicle VC (after the ACC switch turns off and the vehicle VC stops moving), as shown in FIG. 6B, radio communication between the on-vehicle equipment 20 and the mobile terminal 30 is cut off (communication is unavailable), and therefore, the mobile terminal 30 starts measurement etc. and only the location information of the mobile terminal 30 is transmitted to the server 10. In other words, when the state where it is possible only for the mobile terminal 30 to measure location information is brought about, the transmission source switches automatically from the on-vehicle equipment 20 to the mobile terminal 30 and only the location information of the mobile terminal 30 is transmitted to the server 10.

When the user carrying the mobile terminal 30 again gets on the vehicle VC (when the ACC switch turns on and the vehicle VC starts moving), as shown in FIG. 6A, communication between the on-vehicle equipment 20 and the mobile terminal 30 becomes possible by near field communication, and therefore, the mobile terminal 30 stands by without performing measurement or transmission and location information is transmitted to the server 10 only from the activated on-vehicle equipment 20. In other words, when the state is returned where it is possible for both the on-vehicle equipment 20 and the mobile terminal 30 to measure location information, the transmission source switches automatically from the mobile terminal 30 to the on-vehicle equipment 20 and only the location information of the on-vehicle equipment 20 is transmitted to the server 10.

The location information sent in such a manner can be received by the server 10 via the network 90. As shown in FIG. 2B, the server 10 accumulates the received location information in the recorder 13. At that time, as described above, it may also be possible for the server 10 to accumulate the location information received from the mobile terminal 30 in the recorder 13 after appropriately correcting the location information. In other words, it may also be possible for the server 10 to correct the location information received from the mobile terminal 30 based on the location information at the end time when the vehicle VC stops moving, or to correct the location information already received from the mobile terminal 30 (already recorded in the recorder 13) based on the location information at the start time when the vehicle VC starts moving. As described above, by linking the on-vehicle equipment 20 and the mobile terminal 30 so that the location information of the on-vehicle equipment 20, which has a comparatively high accuracy of measurement, is transmitted to the server 10 preferentially, it is possible to record the series of pieces of location information (movement trajectory) in the recorder 13.

Next, the operation when inquiring the movement trajectory of a user based on the location information accumulated in the server 10 (the recorder 13) will be described with reference to FIG. 7. FIG. 7 is a flowchart showing an example of inquiry processing performed by the on-vehicle equipment 20 and response processing performed by the server 10. FIG. 7 shows the case where inquiry processing is performed by the on-vehicle equipment 20, but this case is merely an example, and it is also made possible for the mobile terminal 30 to perform the same inquiry processing. It may also be possible to enable another equipment (e.g. a user's personal computer etc.) to perform the same inquiry processing.

First, the on-vehicle equipment 20 generates inquiry request information in accordance with the operation of a user (step S401). For example, when a user operates the operation unit 27 to give instructions to inquire the movement trajectory, the arithmetic operation processor 26 generates inquiry request information including the user ID etc. The inquiry request information may include the date etc. to specify the range of the movement trajectory to be inquired. In the case where the range is not specified by the date etc., it is made possible for the server 10 to search for the most recent location information (each piece of location information in the range of which the continuity is recognized) from the recorder 13.

The on-vehicle equipment 20 transmits the generated inquiry request information to the server 10 (step S402). In other words, the arithmetic operation processor 26 controls the communication unit 22 to transmit inquiry request information to the server 10.

In response to this, the server 10 receives the inquiry request information (step S501). In other words, the acquisition unit 11 acquires the inquiry request information transmitted from the on-vehicle equipment 20 via the network 90.

The server 10 searches for each piece of location information from the recorder 13 based on the received inquiry request information (step S502). For example, the processor 12 searches for each piece of location information from the recorder 13 using the user ID etc. included in the inquiry request information as a key. In the case where the inquiry request information includes the date etc. to specify the range of the movement trajectory to be inquired, the processor 12 searches for each piece of location information within the specified range from the recorder 13. On the other hand, in the case where the range is not specified by the date etc., the processor 12 searches for the most recent location information (each piece of location information in the range of which the continuity is recognized) from the recorder 13.

In the case where it is not possible to search for effective location information from the recorder 13 (e.g. in the case where the user ID etc. is wrong, the location information corresponding to the specified range of date etc. is not stored in the recorder 13, etc.), it is assumed that the processor 12 generates predetermined error information to return the information to the transmission source.

The server 10 generates a figure representing the movement trajectory based on each piece of location information that is searched for and combines the figure on a map (step S503). For example, the processor 12 generates a free curve representing the movement trajectory based on each piece of location information that is searched for and combines the curve with map information read from the recorder 13. In other words, the processor 12 generates an inquiry image in which the movement trajectories of the user are combined on the map.

The server 10 transmits the generated inquiry image to a request source (step S504). In other words, the processor 12 transmits the inquiry image in which the movement trajectories of the user are combined on the map to the on-vehicle equipment 20. Then, the server 10 ends the response processing.

In response to this, the on-vehicle equipment 20 receives the inquiry image (step S403). In other words, the communication unit 22 receives the inquiry image sent from the server 10 via the network 90.

Figure 8:
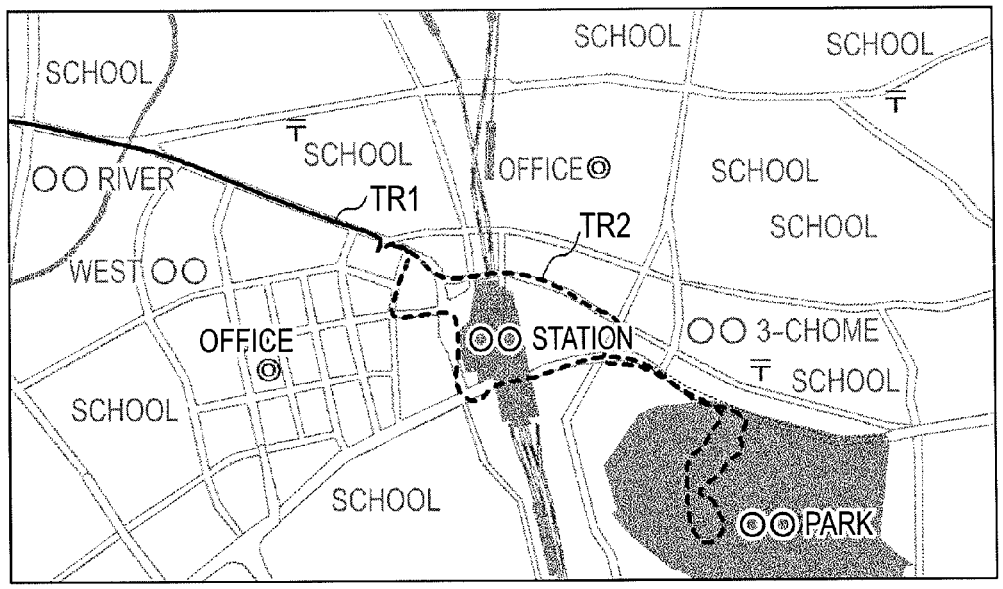
FIG. 8 is an example of an inquiry image including the movement trajectory of a user displayed on the on-vehicle equipment etc. according to the first embodiment of the present invention.

The on-vehicle equipment 20 displays the received inquiry image on the display unit 28 (step S404). For example, the display unit 28 displays an inquiry image in which figures TR1 and TR2 indicative of the movement trajectory are combined on the map as shown in FIG. 8. The figure TR1 indicates the movement trajectory based on each piece of location information measured by the on-vehicle equipment 20. In other words, the figure TR1 indicates the movement trajectory of the user who has moved aboard the vehicle VC. On the other hand, the figure TR2 indicates the movement trajectory based on each piece of location information measured by the mobile terminal 30. In other words, the figure TR2 indicates the movement trajectory of the user who has moved on foot etc.

In FIG. 8, the figure TR1 is indicated by the solid line and the figure TR2 is indicated by the dotted line (broken line), but when the figures TR1 and TR2 are displayed actually on the display unit 28, for example, it may also be possible to draw the figures TR1 and TR2 in different colors without changing the type of line so that both can be discriminated. The display method capable of discriminating both is not limited to this and can be changed appropriately. Further, the figures (figures TR1 and TR2) indicating the movement trajectory are not limited to such free curves and can be changed appropriately.

When the inquiry image as shown in FIG. 8 is displayed on the display unit 28, it is possible to appropriately grasp the movement trajectory of the user. In other words, from the figure TR1, it is possible to grasp the way the user having moved to the vicinity of the station aboard the vehicle VC parks the vehicle VC in a parking area etc. (the vehicle VC stops moving). From the figure TR2, it is possible to grasp the way the user having moved to the park on foot etc. after passing the station moves back to the parking area etc. after walking through the park.

In addition to the above, while the user is moving aboard the vehicle VC, the movement trajectory (the figure TR1) based on the location information of the on-vehicle equipment 20, which has a comparatively high accuracy of measurement, is obtained and it is clear through which road the user has moved. Further, while the user is moving on foot etc., the movement trajectory (the figure TR2) based on the location information of the mobile terminal 30 is obtained, and therefore, the necessary movement trajectory is not lost. As a result of this, it is possible to appropriately process the movement trajectory of the user.

Modified Example of First Embodiment

In the first embodiment, explanation is given in the case where the configuration is such that near field communication is available between the on-vehicle equipment 20 and the mobile terminal 30 and based on the state of near field communication (whether or not communication is available), the mobile terminal 30 controls transmission of location information. The mobile terminal 30 may control transmission of location information using another method without using near field communication. For example, the mobile terminal 30 may control transmission of location information by notification of the state of operation of the on-vehicle equipment 20 to the mobile terminal 30 with a mail by use of mobile communication.

Specifically, when the ACC switch turns on and the vehicle VC starts moving, the communication unit 22 transmits an activation mail to notify activation to the mobile terminal 30 (with a mail address with which the mobile terminal 30 can receive the mail as a destination). In the activation mail, for example, a predetermined character string, such as "Navi ON", is set, and therefore, it is possible for the mobile terminal 30 side to distinguish the activation mail from other mails. The mobile terminal 30 sequentially checks the mail (e.g. subject matter) sent from the on-vehicle equipment 20 and when the communication unit 32 receives the activation mail, the mobile terminal 30 stands by without performing measurement or transmission as in the above-described state where near field communication is available.

On the other hand, when the ACC switch turns off and the vehicle VC stops moving, and immediately before the activation stops (e.g. during the activation for a predetermined time due to the battery etc. of the on-vehicle equipment 20), the communication unit 22 transmits an end mail to notify the end (end of activation) to the mobile terminal 30. In the end mail, for example, a predetermined character string, such as "Navi OFF", is set in the subject matter, and therefore, it is possible for the mobile terminal 30 side to distinguish the end mail from other mails. The mobile terminal 30 sequentially checks the mail sent from the on-vehicle equipment 20 and when the communication unit 32 receives the end mail, the mobile terminal 30 performs measurement and starts transmission of location information as in the above-described state where near field communication is cut off. Then, the mobile terminal 30 continues transmission of location information to the server 10 until the activation mail is received.

As described above, by use of a mail of mobile communication, even if neither the on-vehicle equipment 20 nor the mobile terminal 30 has the function of near field communication, the location information indicative of the location of a user is transmitted to the server 10 from one of the on-vehicle equipment 20 and the mobile terminal 30 having only the function of mobile communication. In other words, by linking the on-vehicle equipment 20 and the mobile terminal 30 and by preferentially transmitting the location information of the on-vehicle equipment 20 having a comparatively high accuracy of measurement to the server 10, it is possible to record a series of pieces of location information (movement trajectory) in the recorder 13.

It may also be possible to appropriately control recording of location information on the reception side instead of controlling transmission of location information on the transmission side (the mobile terminal 30). In other words, the mobile terminal 30 may transmit location information at all times as the on-vehicle equipment 20 does and the server 10 side may control whether to record the location information received from the mobile terminal 30 in the recorder 13 in accordance with the state of reception of the location information.

A navigation system according to a second embodiment of the present invention will be described below, in which the server 10 controls recording of received location information in the recorder 13.

(Second Embodiment)

The general configuration of the navigation system according to the second embodiment of the present invention is the same as that in FIG. 1. Further, the server 10 also has the same configuration as that in FIG. 2A. However, each configuration of the on-vehicle equipment 20 and the mobile terminal 30 partially differs from each configuration of the first embodiment as will be described below.

The on-vehicle equipment 20 has a configuration, which is the configuration shown in FIG. 3 from which the short-distance radio unit 23 is omitted. The difference lies only in that the short-distance radio unit 23 is not used, and therefore, the on-vehicle equipment 20 may have the configuration of the first embodiment as it is, which includes the short-distance radio unit 23. In other words, the on-vehicle equipment 20 differs from that of the first embodiment only in that near field communication with the mobile terminal 30 is not performed and except for this point, the on-vehicle equipment 20 performs the same processing as that of the first embodiment.

When the ACC switch turns on and the vehicle VC starts moving, the on-vehicle equipment 20 sequentially measures location information and displays a map after combining a symbol etc. on the map. Then, at predetermined time intervals (e.g. at 30 sec time intervals), the on-vehicle equipment 20 accesses the server 10 and transmits location information. Specifically, when the transmission timing is reached, the arithmetic operation processor 26 transmits location information to the server 10 after adding the current date and the section to the location information as in the first embodiment. The on-vehicle equipment 20 continues such processing until the ACC switch turns off and the vehicle VC stops moving.

On the other hand, the mobile terminal 30 has a configuration, which is the configuration shown in FIG. 4 from which the short-distance radio unit 33 is omitted. The difference lies only in that the short-distance radio unit 33 is not used, and therefore, the mobile terminal 30 may have the configuration of the first embodiment as it is, which includes the short-distance radio unit 33.

The mobile terminal 30 differs from that of the first embodiment in that the mobile terminal 30 transmits location information to the server 10 at all times because near field communication with the on-vehicle equipment 20 is not performed (the state of communication is not determined). In other words, when the application of navigation is executed, the mobile terminal 30 sequentially measures location information and displays a map after combining a symbol etc. on the map. The mobile terminal 30 may suppress power consumption as low as possible by only measuring location information without producing a display etc. as in the first embodiment. Then, at predetermined time intervals (e.g. at 30 sec time intervals), the mobile terminal 30 accesses the server 10 and transmits location information. Specifically, as in the state where near field communication is cut off in the first embodiment, when the transmission timing is reached, the arithmetic operation processor 36 transmits location information to the server 10 after attaching the current date and the section to the location information. The mobile terminal 30 continues such processing until the execution of the application of navigation ends.

In the second embodiment of the present invention, different from the first embodiment, there may be brought about such a state where location information is transmitted to the server 10 from both the on-vehicle equipment 20 and the mobile terminal 30. For example, in the case where a user carrying the mobile terminal 30 (while executing the application of navigation) is aboard the vehicle VC (the ACC switch is on), location information will be transmitted to the server 10 from both the on-vehicle equipment 20 and the mobile terminal 30 as a result. Hence, in the state where it is possible to receive location information from both the on-vehicle equipment 20 and the mobile terminal 30, the server 10 records only the location information received from the on-vehicle equipment 20 having a comparatively high accuracy of measurement in the recorder 13.

Figure 9:
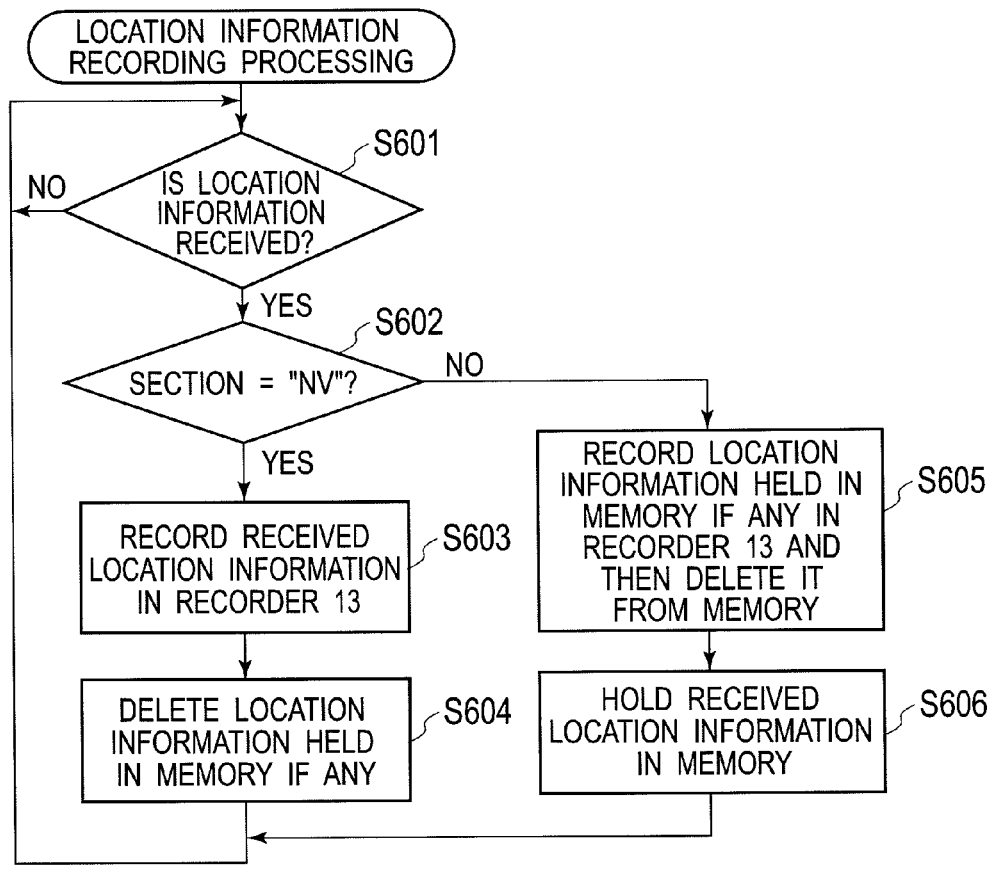
FIG. 9 is a flowchart showing an example of location information recording processing according to a second embodiment of the present invention.

The operation of recording location information by the server 10 as described above will be described with reference to the drawings. FIG. 9 is a flowchart showing an example of location information recording processing according to the second embodiment of the present invention. In FIG. 9, in order to facilitate understanding of the processing contents, the location information in the flowchart represents the location information when the server 10 is accessed with the same user ID. Actually, location information with a different user ID (of another user) may be sent, and therefore, the server 10 performs processing to sort location information according to the user ID, but in FIG. 9, such processing is omitted.

In the flowchart in FIG. 9, it is premised that the on-vehicle equipment 20 and the mobile terminal 30 transmit location information at the same time intervals (e.g. at 30 sec time intervals). In other words, in the state where location information is transmitted from both the on-vehicle equipment 20 and the mobile terminal 30, the server 10 will receive location information alternately from both as a result (location information from the same device is not received successively). On the other hand, when the ACC switch turns off and the vehicle VC stops moving, location information is no longer transmitted from the on-vehicle equipment 20, and therefore, the server 10 will receive location information from the mobile terminal 30 successively as a result.

Hereinafter, the location information recording processing that premises those described above will be described First, the server 10 stands by until receiving location information (step S601). In other words, until the acquisition unit 11 acquires location information from the on-vehicle equipment 20 or the mobile terminal 30 (step S601; No), the processor 12 stands by while sequentially checking the presence/absence of reception without proceeding to the subsequent processing.

On the other hand, upon receipt of location information (step S601; Yes), the server 10 determines whether or not the section included in the location information is "NV" (step S602). In other words, the processor 12 determines whether the received location information is sent from the on-vehicle equipment 20.

When determining that the section included in the location information is "NV" (step S602; Yes), the server 10 records the received location information in the recorder 13 (step S603). In other words, the processor 12 records the location information received from the on-vehicle equipment 20 in the recorder 13 as it is.

The server 10 deletes location information held in the memory if any (step S604). In other words, if there is any location information held temporarily in the RAM etc. without being recorded in the recorder 13 (as will be described, location information sent from the mobile terminal 30), the processor 12 deletes the location information. Then, the server 10 returns the processing to step S601.

On the other hand, when determining that the section included in the location information is not "NV" (the section included in the location information is "CP") at step S602 (step S602; No), the server 10 records location information held in the memory in the recorder 13 if any and deletes the location information from the memory (step S605). In other words, in the case where there remains location information not deleted yet from the RAM etc., that is, in the case of receiving location information of the mobile terminal 30 successively without receiving location information of the on-vehicle equipment 20, the processor 12 records the location information held in the RAM etc. (the location information of the mobile terminal 30 received previously) in the recorder 13 and then deletes the location information from the RAM etc. The processor 12 may appropriately correct the location information received from the mobile terminal 30 when recording the location information in the recorder 13 as in the first embodiment.

Then, the server 10 holds the received location information in the memory (step S606). In other words, the processor 12 temporarily holds the location information received at this time from the mobile terminal 30 in the RAM etc. Then, the server 10 returns the processing to step S601.

There may be a case where the location information of the mobile terminal 30 received last is kept being held in the memory. For example, in the state where location information is sent only from the mobile terminal 30 (e.g. in the state where a user moves on foot etc.), if new location information is no longer sent from the mobile terminal 30 (because the battery of the mobile terminal 30 has died etc.), the location information held in the memory at step S606 described above will not be recorded in the recorder 13 as a result. Hence, the processor 12 may record location information held in the memory if any in the recorder 13 each time a predetermined time elapses without reception of new location information, for example, in checking of reception at step S601.

By such location information recording processing, the server 10 can record the location information as shown in FIG. 2B in the recorder 13 as in the first embodiment. In other words, in the case where a user carrying the mobile terminal 30 is aboard the vehicle VC, location information is transmitted to the server 10 from both the on-vehicle equipment 20 and the mobile terminal 30, but the server 10 records only the location information from the on-vehicle equipment 20 in the recorder 13 and deletes the location information from the mobile terminal 30. On the other hand, after the user gets off the vehicle VC (after the ACC switch turns off and the vehicle VC stops moving), location information is transmitted to the server 10 only from the mobile terminal 30 and the server 10 records the location information from the mobile terminal 30 received successively in the recorder 13. As a result of this, the server 10 according to the second embodiment can also appropriately record a series of pieces of location information (movement trajectory) by preferentially recording the location information of the on-vehicle equipment 20 having a comparatively high accuracy of measurement in the recorder 13.

When a request to inquire the movement trajectory is made from the on-vehicle equipment 20 etc., the server 10 generates an inquiry image, in which the movement trajectories of a user are combined on a map, based on the location information accumulated in the recorder 13 and transmits the inquiry image to the on-vehicle equipment 20 etc. In other words, in the second embodiment also, by performing the inquiry processing and response processing in FIG. 7, it is possible to have the inquiry image as in FIG. 8 displayed on a request source (the on-vehicle equipment 20 etc.) as in the first embodiment. As a result of this, it is possible to appropriately process the movement trajectory of a user.

Modified Example of Second Embodiment

In the second embodiment, the case is described where it is premised that the on-vehicle equipment 20 and the mobile terminal 30 transmit location information at the same time intervals, but the on-vehicle equipment 20 and the mobile terminal 30 may transmit location information at different time intervals, respectively. Further, as described in the first embodiment, it may also be possible to have the on-vehicle equipment 20 and the mobile terminal 30 accumulate location information at predetermined time intervals and transmit each piece of the accumulated location information to the server 10 when the velocity becomes zero etc. Because of this, the server 10 may control recording of location information in the recorder 13 based on the time zone of movement of the vehicle VC and the date included in the location information in order to deal with such a case.

For example, it may also be possible to have the on-vehicle equipment 20 notify the server 10 of the start time when the vehicle VC starts moving and the end time when the vehicle VC stops moving and then not to record the location information received from the mobile terminal 30 during the period of time from the start time to the end time (the time zone of movement of the vehicle VC) in the recorder 13.

Specifically, when the ACC switch turns on and the vehicle VC starts moving, the on-vehicle equipment 20 transmits start information to notify the start of movement to the server 10. The start information includes, for example, a user ID, information indicative of the start of movement of the vehicle VC, date (current time), etc. The server 10 stores the received start information in the memory as the start time when the vehicle VC starts moving.

Further, the server 10, each time receiving location information, records the location information in the recorder 13 if it is the location information received from the on-vehicle equipment 20. On the other hand, the server 10, each time receiving location information, stores the location information in the memory if it is the location information received from the mobile terminal 30. In the case where the start time is not stored in the memory or in the case where the end time is stored in the memory, the state is such that location information cannot be received from the on-vehicle equipment 20, and therefore, the server 10 records the location information received from the mobile terminal 30 in the recorder 13.

After that, when the ACC switch turns off and the vehicle VC stops moving, and immediately before the activation stops (e.g. during the activation for a predetermined time due to the battery etc. of the on-vehicle equipment 20), the on-vehicle equipment 20 transmits end information to notify the end of movement to the server 10. The end information includes, for example, a user ID, information indicative of end of movement of the vehicle VC, date (current time), etc. The server 10 stores the received end information in the memory as the end time when the vehicle VC stops moving.

The server 10 deletes the location information, which is measured in the time zone of movement of the vehicle VC (the range from the start time to the end time) from the memory, of respective pieces of the location information from the mobile terminal 30 stored in the memory. In other words, if the date of the location information is included in the time zone of movement, the server 10 deletes the location information from the memory. The server 10 records the location information from the mobile terminal 30 remaining in the memory (location information not included between the start time and the end time) in the recorder 13.

As described above, it is possible to record the location information as shown in FIG. 2B in the recorder 13 by controlling recording of location information in the recorder 13 based on the time zone of movement of the vehicle VC and the date included in the location information.

In the second embodiment, the case is described where the server 10 controls recording of the received location information in the recorder 13, but it may also be possible to cause the server 10 to appropriately perform control when the recorded location information is used (read) instead of causing the server 10 to control recording in the recorder 13. In other words, the server 10 may record all the received location information in the recorder 13 and control reading of location information from the recorder 13 when generating an inquiry image (movement trajectory).

Hereinafter, a navigation system according to a third embodiment of the present invention will be described, which controls reading of location information from the recorder 13 when generating an inquiry image (movement trajectory).

Third Embodiment

The general configuration of the navigation system according to the third embodiment of the present invention is the same as the configuration in FIG. 1. Further, the server 10 has the same configuration as that in FIG. 2A. On the other hand, each configuration of the on-vehicle equipment 20 and the mobile terminal 30 is the same as that in the second embodiment. In the third embodiment also, the configuration may be the configuration in the first embodiment as it is because the difference lies only in that near field communication is not used.

As in the second embodiment, when the ACC switch turns on and the vehicle VC starts moving, the on-vehicle equipment 20 is activated and sequentially measures location information and displays a map after combining a symbol etc. on the map. Then, the on-vehicle equipment 20 accesses the server 10 and transmits location information at predetermined time intervals.

As in the second embodiment, when the application of navigation is executed, the mobile terminal 30 sequentially measures location information and displays a map after combining a symbol etc. on the map. The mobile terminal 30 may suppress power consumption as low as possible by only measuring location information without producing a display etc. Then, the mobile terminal 30 accesses the server 10 and transmits location information at predetermined time intervals.

The server 10 accumulates received location information in the recorder 13. In other words, in the third embodiment, all the location information sent from the on-vehicle equipment 20 and the mobile terminal 30 is recorded in the recorder 13.

Next, the operation when inquiring the movement trajectory of a user based on all the location information accumulated in the server 10 (the recorder 13) will be described with reference to FIG. 10.

Figure 10:
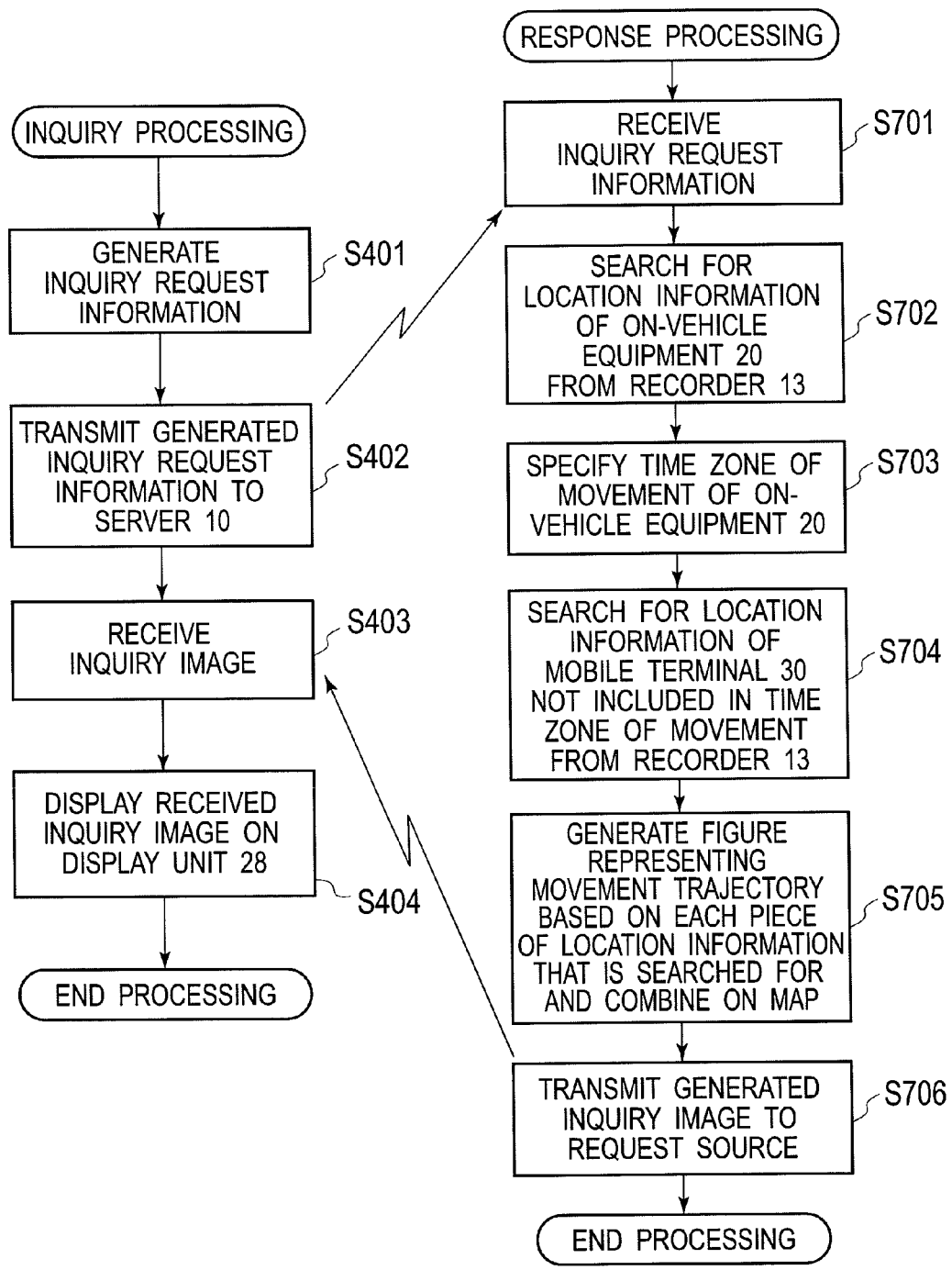
FIG. 10 is a flowchart showing an example of inquiry processing and response processing according to a third embodiment of the present invention.

FIG. 10 is a flowchart showing an example of inquiry processing performed by the on-vehicle equipment 20 and response processing performed by the server 10 according to the third embodiment of the present invention. The inquiry processing in FIG. 10 has the same contents of the inquiry processing in FIG. 7, and therefore, the same reference symbols are attached. FIG. 10 shows the case where the inquiry processing is performed by the on-vehicle equipment 20, but this is merely an example and the mobile terminal 30 may also perform the same inquiry processing. Further, another device (e.g. a personal computer of a user etc.) may perform the same inquiry processing.

First, the on-vehicle equipment 20 generates inquiry request information in accordance with the operation of a user (step S401) and transmits the generated inquiry request information to the server 10 (step S402).

In response to this, the server 10 receives the inquiry request information (step S701). In other words, the acquisition unit 11 acquires the inquiry request information sent from the on-vehicle equipment 20 via the network 90. In the case where the inquiry request information includes the date etc. to specify the range of the movement trajectory to be inquired, in the following explanation, it is assumed that the location information is limited to each piece of the location information within the specified range.

The server 10 searches for location information of the on-vehicle equipment 20 from the recorder 13 (step S702). In other words, the processor 12 searches for location information whose section is "NV" from each piece of the location information of the recorder 13 (location information of the user ID included in the inquiry request information). In other words, the processor 12 searches for only the location information of the on-vehicle equipment 20.

The server 10 specifies the time zone of movement of the vehicle VC (step S703). For example, the processor 12 specifies the time zone of movement of the vehicle VC (from the start time to the end time) from the dates (the first date and the last date) of a plurality of pieces of location information that is searched for. It is assumed that in the case where a plurality of time zones of movement is specified because of continuity in the dates of the plurality of pieces of location information that is searched for, the processor 12 specifies each time zone of movement.

The server 10 searches for location information of the mobile terminal 30 not included in the specified time zone of movement from the recorder 13 (step S704). For example, the processor 12 searches for location information whose section is "CP" and whose date is not included in the time zone of movement from each piece of the location information in the recorder 13. In other words, the processor 12 searches for location information of the mobile terminal 30 not included in the period of time from the start time to the end time.

The server 10 generates a figure representing the movement trajectory based on each piece of location information that is searched for (location information of the on-vehicle equipment 20 and location information of the mobile terminal 30 not included in the period of time from the start time to the end time) and combines the figure on the map (step S705). For example, the processor 12 generates a free curve representing the movement trajectory based on each piece of location information that is searched for and combines the curve with map information read from the recorder 13. In other words, the processor 12 generates an inquiry image in which the movement trajectories of a user are combined on a map.

The server 10 transmits the generated inquiry image to a request source (step S706). In other words, the processor 12 transmits the inquiry image in which the movement trajectories of a user are combined on a map to the on-vehicle equipment 20. Then, the server 10 ends the response processing.

In response to this, the on-vehicle equipment 20 receives the inquiry image (step S403) and displays the received inquiry image on the display unit 28 (step S404). For example, the display unit 28 displays the inquiry image as shown in FIG. 8. When the inquiry image as shown in FIG. 8 is displayed on the display unit 28, as in the first embodiment, it is possible to appropriately grasp the movement trajectory of a user. In other words, while the user is moving aboard the vehicle VC, the movement trajectory (figure TR1) based on the location information of the on-vehicle equipment 20 having a comparatively high accuracy of measurement is obtained and it is made clear through which road the user has moved. Further, while the user is moving on foot etc., the movement trajectory (figure TR2) based on the location information of the mobile terminal 30 is obtained and the necessary movement trajectory is not lost. As a result of this, it is possible to appropriately process the movement trajectory of the user.

Other Embodiments

In the first to third embodiments, explanation is given using the navigation system including the server 10, the on-vehicle equipment 20, and the mobile terminal 30 as shown in FIG. 1 as an example, but it is also possible to appropriately apply the present invention to a navigation system including the on-vehicle equipment 20 and the mobile terminal 30, without using the server 10.

For example, it is possible to obtain the location information of the on-vehicle equipment 20 and the mobile terminal 30 by causing each of the on-vehicle equipment 20 and the mobile terminal 30 to accumulate the location information measured by each of the on-vehicle equipment 20 and the mobile terminal 30 (location information for the movement trajectory) and by causing one of the on-vehicle equipment 20 and the mobile terminal 30 to transmit the location information accumulated by the one of the on-vehicle equipment 20 and the mobile terminal 30 to the other. Then, it is possible to generate and display an inquiry image in which the movement trajectories of a user are combined on a map based on the obtained location information of the on-vehicle equipment 20 and the mobile terminal 30.

Specifically, the case where the first embodiment is implemented without using the server 10 will be simply described. Explanation is given using the case where the on-vehicle equipment 20 displays an inquiry image as an example, but it is possible to implement the first embodiment also in the case where the mobile terminal 30 displays an inquiry image.

When a request to display an inquiry image is made from a user, the communication unit 22 of the on-vehicle equipment 20 tries to start near field communication with the mobile terminal 30. If communication is available, the communication unit 22 requests the mobile terminal 30 to transmit location information by near field communication.

In response to the request, the mobile terminal 30 transmits the accumulated (stored) location information to the on-vehicle equipment 20 by near field communication. As in the first embodiment, in the mobile terminal 30, the location information in the case where near field communication with the on-vehicle equipment 20 is cut off (a user is moving on foot etc.) is accumulated, and therefore, the communication unit 22 of the on-vehicle equipment 20 can obtain the location information when a user is outside the vehicle as it is. In this case, the communication unit 22 of the on-vehicle equipment 20 functions as an acquisition unit configured to acquire the location information of the mobile terminal 30 like the acquisition unit 11 of the server 10. The GPS unit 21 functions as an acquisition unit configured to acquire the location information of the on-vehicle equipment 20.

Then, the arithmetic operation processor 26 of the on-vehicle equipment 20 processes the location information accumulated by itself and the location information acquired from the mobile terminal 30. For example, the arithmetic operation processor 26 generates an inquiry image in which figures representing the movement trajectory are combined on a map and displays the inquiry image on the display unit 28. In addition to the above, the arithmetic operation processor 26 may store the location information acquired from the mobile terminal 30 in the hard disk 25. In this case, the arithmetic operation processor 26 of the on-vehicle equipment 20 functions as a processor configured to process the location information acquired from the on-vehicle equipment 20 and the mobile terminal 30 like the processor 12 of the server 10. Further, the hard disk 25 of the on-vehicle equipment 20 functions as a recorder configured to record the location information acquired from the on-vehicle equipment 20 and the mobile terminal 30 like the recorder 13 of the server 10.

The on-vehicle equipment 20 may try to start near field communication with the mobile terminal 30 when, for example, the ACC switch turns on and the vehicle VC starts moving, not only in the case where a request to display an inquiry image is made. If communication is available, the on-vehicle equipment 20 may make a request to transmit location information to the mobile terminal 30 each time and sequentially acquire the location information of the mobile terminal 30.

Next, the case where the second and third embodiments are implemented without using the server 10 will simply be described. Explanation is given using the case where the on-vehicle equipment 20 displays an inquiry image as an example, but it is possible to implement the second and third embodiments also in the case where the mobile terminal 30 displays an inquiry image by appropriately making a change thereto.

When a request to display an inquiry image is made from a user, the communication unit 22 of the on-vehicle equipment 20 makes a request to transmit location information to the mobile terminal 30 by mobile communication. For example, the communication unit 22 makes a request to transmit location information by transmitting a predetermined request mail.

In response to the request, the mobile terminal 30 transmits the accumulated (stored) location information to the on-vehicle equipment 20 by mobile communication. For example, the mobile terminal 30 returns a response mail including location information. As in the second and third embodiments, in the mobile terminal 30, the location information measured while the application of navigation is activated is accumulated, and therefore, the communication unit 22 of the on-vehicle equipment 20 will obtain the location information of the mobile terminal 30 that may overlap the time zone of movement of the vehicle VC (from the start time to the end time) as a result. In this case, the communication unit 22 of the on-vehicle equipment 20 functions as an acquisition unit configured to acquire the location information of the mobile terminal 30 like the acquisition unit 11 of the server 10. The GPS unit 21 functions as an acquisition unit configured to acquire the location information of the on-vehicle equipment 20.

Then, the arithmetic operation processor 26 of the on-vehicle equipment 20 processes the location information accumulated by itself and the location information acquired from the mobile terminal 30. For example, in the case where the date of the acquired location information of the mobile terminal 30 is included in the time zone of movement, the arithmetic operation processor 26 deletes the location information without storing it in the hard disk 25 as in the second embodiment. On the contrary, if the date of the location information of the mobile terminal 30 is not included in the time zone of movement, the arithmetic operation processor 26 stores the location information in the hard disk 25. In this case, the arithmetic operation processor 26 of the on-vehicle equipment 20 functions as a processor configured to process the location information of the on-vehicle equipment 20 and the mobile terminal 30 like the processor 12 of the server 10. Further, the hard disk 25 of the on-vehicle equipment 20 functions as a recorder configured to record the location information of the on-vehicle equipment 20 and the mobile terminal 30 like the recorder 13 of the server 10.

As a result of this, the on-vehicle equipment 20 may obtain only the location information when a user is outside the vehicle from the mobile terminal 30. Further, the on-vehicle equipment 20 may generate and display the inquiry image as shown in FIG. 8 by itself.

On the other hand, the arithmetic operation processor 26 of the on-vehicle equipment 20 may store all the location information acquired from the mobile terminal 30 in the hard disk 25 and control reading of location information when generating an inquiry image (movement trajectory) as in the third embodiment. In other words, the arithmetic operation processor 26 specifies the time zone of movement of the vehicle VC from the date of the location information accumulated by itself (location information of the on-vehicle equipment 20). Then, the arithmetic operation processor 26 reads the location information whose date is not included in the time zone of activation of the location information acquired from the mobile terminal 30.

Then, the on-vehicle equipment 20 generates an inquiry image in which figures representing the movement trajectory are combined on a map based on the location information accumulated by itself (location information of the on-vehicle equipment 20) and the read location information (location information of the mobile terminal 30) and displays the inquiry image on the display unit 28. In this case, the arithmetic operation processor 26 of the on-vehicle equipment 20 functions as a processor configured to process the location information of the on-vehicle equipment 20 and the mobile terminal 30 like the processor 12 of the server 10. As a result of this, the on-vehicle equipment 20 can generate and display the inquiry image as shown in FIG. 8 by itself.

As explained above, according to the embodiments of the present invention, it is possible to appropriately process the movement trajectory of a user.

It is possible to implement the present invention by using a normal computer system, not using a dedicated system. For example, it is possible to configure the information processing device according to the present invention by installing a program for causing a computer to perform the above-described processing from an information recording medium storing the program (computer-readable information recording medium, such as compact disc, flexible disc, hard disk, magneto-optical disc, digital video disc, magnetic tape, and semiconductor memory).

Further, any method for supplying the program to a computer may be used. For example, it may also be possible to supply the program via a computer communication network. For example, it may also be possible to enable installation (enable distribution) of the program via a network by storing the program in a server arranged on the network, such as the Internet.

Furthermore, it is possible to distribute or sell the program via a computer communication network independently of a computer by which the program is executed. It is possible to distribute or sell the above-mentioned information recording medium independently of the computer.

One or more of the acquisition unit 11, the processor 12, and the recorder 13 may be incorporated in the on-vehicle equipment 20 or in the mobile terminal 30.

What is claimed is:

1. An information processing device comprising:
   an acquisition unit configured to acquire location information of moving object mounted equipment and a mobile terminal;
   a movement detector configured to detect start and end of movement of a moving object mounting the moving object mounted equipment;
   a processor configured to perform processing to select location information of the moving object mounted equipment from the start until the end of the movement of the moving object detected by the movement detector, and to select location information of the mobile terminal after the movement detector detects the end of the movement of the moving object; and
   an output stop instruction unit configured to give an instruction to stop measurement and output of location information to the mobile terminal when the processor does not select location information of the mobile terminal.

2. The information processing device according to claim 1, further comprising a display unit configured to display a movement trajectory of the moving object mounted equipment and the mobile terminal based on the location information processed by the processor.

3. A processing method comprising:
acquiring location information of moving object mounted equipment and a mobile terminal;
detecting start and end of movement of a moving object mounting the moving object mounted equipment;
performing processing to select location information of the moving object mounted equipment from the start until the end of the movement of the moving object detected in the detecting, and to select location information of the mobile terminal after detecting the end of the movement of the moving object in the detecting; and
giving an instruction to stop measurement and output of location information to the mobile terminal when not selecting location information of the mobile terminal in the processing.

4. A non-transitory computer usable medium having a computer readable program embodied therein, the program comprising:
a first program code causing the computer to acquire location information of moving object mounted equipment and a mobile terminal;
a second program code causing the computer to detect start and end of movement of a moving object mounting the moving object mounted equipment;
a third program code causing the computer to perform processing to select location information of the moving object mounted equipment from the start until the end of the movement of the moving object detected by the detection and to select location information of the mobile terminal after detecting the end of the movement by the detection; and
a fourth program code causing the computer to give an instruction to stop measurement and output of location information to the mobile terminal when not selecting location information of the mobile terminal by the processing.

* * * * *